United States Patent  [11] 3,607,821

| [72] | Inventors | Michael R. Clarke |
|------|-----------|-------------------|
|      |           | Frankston, Victoria; |
|      |           | Leon Filipowicz, East St. Kilda, Victoria, both of Australia |
| [21] | Appl. No. | 740,469 |
| [22] | Filed     | June 27, 1968 |
| [45] | Patented  | Sept. 21, 1971 |
| [73] | Assignee  | Balm Paints Limited |
|      |           | Melbourne, Victoria, Australia |
| [32] | Priority  | July 6, 1967 |
| [33] |           | Australia |
| [31] |           | 24202/67 |

[54] PROCESS OF PREPARING STABLE DISPERSIONS OF SYNTHETIC POLYMER PARTICLES IN AN INERT ORGANIC LIQUID
8 Claims, No Drawings

[52] U.S. Cl. .................................................. 260/34.2,
260/33.6 R, 260/33.6 UA
[51] Int. Cl. ........................................................ C08f 47/20,
C08j 1/46

[50] Field of Search ............................................. 260/34.2, 33.6, 33.6 UA

[56] References Cited
UNITED STATES PATENTS

| 3,232,903 | 2/1966 | Schmidle et al. | 260/33.6 |
| 3,317,635 | 5/1967 | Osmond | 260/34.2 |
| 3,331,801 | 7/1967 | Osmond et al. | 260/34.2 |

*Primary Examiner*—Allan Lieberman
*Attorney*—Cushman, Darby & Cushman

ABSTRACT: Stable dispersions of synthetic polymer in an inert organic liquid in which the polymer is insoluble are prepared by forming the particles in the liquid in the presence in solution in the liquid of a polymeric stabilizer which associates with the particles and provides around the particles a stabilizing steric barrier. Additionally, the stabilizer is coreacted with the disperse polymer, each coreacted stabilizer molecule forming covalent links with the disperse polymer. The coreaction may be an addition or a copolymerization reaction.

PROCESS OF PREPARING STABLE DISPERSIONS OF SYNTHETIC POLYMER PARTICLES IN AN INERT ORGANIC LIQUID

This invention relates to dispersions of polymeric particles in organic liquids in which the particles are insoluble, to processes of preparing such dispersions and to stabilizers for use therein.

It has been proposed to stabilize a dispersion of polymer particles in an inert organic liquid in which the polymer is insoluble by means of a polymeric stabilizer which associates with the disperse polymer particles, the said stabilizer comprising one or more components which are solvated by the organic liquid and provide around the disperse polymer particles a stabilizing steric barrier. The associative force between the stabilizer and the disperse polymer may, for example, be a mass-dependent force generated between components of the stabilizer which are not solvated by the organic liquid and the disperse polymer. Alternatively, it may be a force generated by strong specific interaction between polar groups in the stabilizer and complementary polar groups in the disperse polymer.

Whilst the use of these stabilizers resulted in polymer dispersions of value in, for example, coating compositions, certain limitations were encountered in some specific applications. For example the dispersions so-formed may be unstable when subjected to high mechanical shear, e.g. in certain milling processes. Also, the tolerance of the dispersion to the presence of a proportion, usually a minor proportion, of organic liquids which *per se* are solvents or swelling agents for the disperse polymer, e.g. external plasticizers or coalescing agents, in the inert organic liquid is limited by the ability of the dispersant to maintain a stable dispersion, especially on storage.

We have now found that the stability of such dispersions can be usefully increased by utilizing polymeric stabilizers as herein defined which in addition to associating with and providing a stabilizing steric barrier around the disperse particles, are reacted chemically with the said particles to provide at least one covalent link per coreacted stabilizer molecule between the stabilizer and the disperse polymer.

We now provide a process of making a stable dispersion of particles of synthetic polymer in an inert organic liquid in which the polymer is insoluble by forming the particles in the liquid in the presence in solution in the liquid of a polymeric stabilizer as herein defined which associates with the particles and provides around the particles a stabilizing steric barrier and characterized in that additionally the polymeric stabilizer is coreacted with the disperse polymer, each coreacted stabilizer molecule forming from one to 10, preferably from one to four covalent links with the disperse polymer.

We further provide a stable dispersion of particles of synthetic polymer in an inert organic liquid in which the polymer is insoluble, the dispersion containing a polymer stabilizer as herein defined which associates with the disperse polymer particles and provides around the said particles a stabilizing steric barrier and characterized in that the polymeric stabilizer is coreacted with the disperse polymer, each coreacted stabilizer molecule having from one to 10, preferably from one to four covalent links with the disperse polymer.

The covalent links between stabilizer and disperse polymer are formed by coreaction between chemical groups provided by the stabilizer and complementary chemical groups provided by the disperse polymer or by a copolymerization reaction.

In yet another embodiment of our invention the enhanced stabilizing ability of the stabilizers we now describe is utilized to form coalesced films from a stable dispersion in an inert organic liquid of polymeric particles at temperatures below the glass transition temperature of the disperse polymer.

In this embodiment of our invention the inert organic liquid comprises at least one liquid which is a nonsolvent for the disperse polymer together with at least one other liquid of lower volatility than the nonsolvent liquid and which in addition is a solvent for the disperse polymer.

By inert organic liquid we mean one which does not interfere with the association between the stabilizer and the disperse polymer; also if the disperse polymer is produced by polymerization of monomer in the liquid, the liquid is inert with respect to the polymerization reaction.

In general the disperse polymer will be an addition polymer prepared by dispersion polymerization in the inert organic liquid of one or more $\alpha, \beta$-ethylenically unsaturated monomers, for example vinyl chloride, vinyl acetate, vinylidene chloride, alkyl (meth) acrylate esters, diesters of maleic acid (anhydride) or itaconic acid, styrene, **-methyl styrene and vinyl toluene.

The general requirement is that the addition polymer produced should be sufficiently polar relative to the liquid, or sufficiently self-associated or crystalline in structure to be insoluble in the liquid.

The coreaction by means of which chemical bonds are formed between stabilizer molecules and the disperse polymer may be an addition reaction between chemically reactive groups provided by the stabilizer molecules and complementary chemically reactive groups provided by the disperse polymer. Suitable pairs of complementary groups include, for example:

Acid anhydride group with hydroxyl group
Acid anhydride group with amine group
Acid anhydride group with mercaptan group
Epoxide group with acid group
Epoxide group with amine group
Isocyanate group with hydroxyl group
Isocyanate group with amine group
Hemiformal group with amide group
Carbonate group with amine group
N-carbamyl
cycloimide group with amine group
cycloimide group with hydroxyl group The general conditions under which addition reactions take place between such pairs of groups are well known and it will be understood that the temperatures at which these reactions take place depend on the pairs of reactive groups selected and may also be modified by the use of catalysts. For example, the following are some typical suitable reaction conditions:

| Pairs of Co-Reactive Groups | Catalyst | Temperature |
| --- | --- | --- |
| acid anhydride: hydroxyl | triethylamine or N-dimethyl amine | 80 – 125°C |
| acid anhydride: amine | nil | 20 – 125°C |
| expoxide: acid | triethylamine | 80 – 125°C |
| epoxide: amine | nil | 20 – 100°C |
| isocyanate: alcohol hydroxyl | stannous chloride or zinc chloride | 30 – 125°C |
| isocyanate: amine | nil | 20 – 100°C |
| carbonate: amine | nil | room temperature |
| N-carbamyl cycloimide: hydroxyl | zinc chloride | 50 – 130°C |
| N-carbamyl cycloimide: amine | nil | 30 – 100°C |

The chemically reactive group is provided in the disperse polymer by use in the dispersion polymerization of an $\alpha, \beta$-ethylenically unsaturated monomer containing such a group. The disperse polymer may be a copolymer derived from such a monomer containing the reactive group, the monomer usually being copolymerized in a minor proportion.

Suitable monomers providing reactive groups include, for example: maleic anhydride (acid) and itaconic acid, acid esters of maleic and itaconic acid, glycidyl (meth) acrylate, hydroxyalkyl (meth) acrylate, acrylamide, methacrylamide, dimethyl aminoethyl methacrylate, vinylidene carbonate and N-carbamyl maleimide.

The number of chemically reactive groups in the disperse polymer is not critical, the only requirement being that a sufficient number of such groups must be available in the polymer to coreact with the selected number of coreacting groups provided by the stabilizer. An excess of chemically reactive groups over the stoichiometric proportion required for the coreaction may be present in the disperse polymer. The actual number of chemically reactive groups taking part in the coreaction is determined by, for example the reaction conditions and the weight ratio of stabilizer to disperse polymer.

Alternatively, the stabilizer may provide $\alpha$, $\beta$-ethylenically unsaturated groups which take part in the dispersion polymerization process. That is the stabilizer molecule is chemically linked to the disperse polymer by a copolymerization reaction.

The stabilizers of this invention are herein defined as being polymeric, by which we mean polymeric materials which may contain as few as three or four, but usually contain 10 or more repeating monomeric units per molecule. They are first selected from known types of stabilizers which provide components solvatable by the organic liquid of the dispersion and anchoring components which have an affinity for and become associated with the disperse polymer, for example because they are of similar polymeric structure or because of interaction between polar groups in the stabilizer molecules and complementary polar groups in the disperse polymer. Additionally they must provide the chemically reactive groups or the $\alpha$, $\beta$-ethylenically unsaturated groups for coreaction with the disperse polymer. Either the selected stabilizer will itself provide the required groups or these groups must be introduced into it. When a selected stabilizer is so-modified, it must remain soluble in the organic liquid of the dispersion and retain the above-mentioned characteristics of the unmodified stabilizers. Stabilizers having these properties are referred to throughout this specification as stabilizers as herein defined.

For example, the stabilizer may be derived from a block or graft copolymer as described in copending Australian Pat. applications Nos. 62,378/65 and 62,379/65; the stabilizer comprising at least one component which is solvated by the inert organic liquid and at least one other component, herein termed the anchoring component, of different polarity which is relatively nonsolvated by the liquid, the solvated component having a molecular weight of from 500 to 5,000, the anchoring component having a molecular weight of at least 250 and the total weight ratio of solvated component to anchoring component being from 0.5 : 1.0 to 5.0 : 1.0. Reactive groups may be introduced into the anchoring component of the stabilizer by, for example, the selection of a suitable monomeric constituent in the preparation of the stabilizer.

Alternatively, the stabilizer may be as described in copending Australian application No. 1,449/66, in which the association between the stabilizer and the disperse polymer is the result of the interaction between complementary polar groups. The interaction may be between acidic and basic groups in the stabilizer and the disperse polymer, such interaction including hydrogen bonding, or between fixed dipoles in the stabilizer and complementary fixed or induced dipoles in the disperse polymer. In this embodiment it is the specific polar groups of the stabilizer which interact with the disperse polymer which we refer to as the anchoring components.

The desired chemically reactive groups may already be present in the stabilizer, which is selected with regard to the nature of the inert organic liquid and of the disperse polymer. For example the association between the stabilizer and the disperse polymer may be the result of the interaction between anhydride groups in the stabilizer and epoxide groups in the disperse polymer. At temperature higher than those customarily used in the dispersion polymerization process and/or in the presence of a catalyst, e.g. a tertiary amine, at least some of the anhydride groups and epoxide groups can be coreacted to provide covalent links between the stabilizer and disperse polymer.

When a selected stabilizer does not comprise suitable reactive groups the required groups are introduced into the molecule by incorporating therein a proportion of a component supplying the desired groups or alternatively by a chemical modification of groups already present in the molecule. Bearing in mind that the modified stabilizer must remain soluble in the organic liquid this will in general mean that the modification is carried out without altering the solvated components of the stabilizer. That is the modification is made to the stabilizer molecule by the introduction into the molecule of a proportion of a component supplying the desired groups or by the modification of groups already present in the anchoring component of the molecule.

For example the required chemically reactive groups may be introduced into the stabilizer molecule by copolymerizing therein suitable $\alpha$, $\beta$-ethylenically unsaturated monomer containing such groups. Suitable monomers have already been discussed above with reference to the disperse polymer. An indirect method of introducing a suitable group is to utilize a reactive group of a nonpreferred type present in a stabilizer by modifying the group so as to introduce the desired reactive group. For example an epoxide ring provided by the stabilizer may be reacted with e.g. methacrylic acid to introduce into the stabilizer molecule a double bond capable of copolymerizing with monomer from which the disperse polymer is formed, during the dispersion polymerization process. The epoxide ring itself may have been introduced into a stabilizer by copolymerizing therein a minor proportion of a suitable monomer, e.g. glycidyl methacrylate.

The number of reactive groups to be provided by each stabilizer molecule is related to the type of reaction and reaction conditions, for example reaction temperature and relative concentrations of stabilizer and disperse polymer, under which the coreaction is to take place. While each stabilizer molecule must provide at least one reactive group for coreaction with the disperse polymer, we limit the maximum number of such groups present in the molecule so that under the chosen coreaction conditions not more than 10 covalent bonds form between each coreacted stabilizer molecule and the disperse polymer. This can be achieved in two ways. The maximum number of reactive groups per stabilizer molecule can be limited to 10 or having established the efficiency of coreaction of a particular stabilizer-disperse polymer system the number of reactive groups per stabilizer molecule can be adjusted to provide the required number of covalent links. It will be appreciated that it is not normally practicable, nor is it necessary, for each stabilizer molecule which so-reacts to form the same number of covalent bonds with the disperse polymer. In particular, a minor proportion, for example 5 –10 percent, of the reacting stabilizer molecules may form more than 10 covalent bonds with the disperse polymer, when the stabilizer provides a sufficient number of reactive groups; which is a normal limitation on the accuracy with which polymer reactions can be specified.

In general, when a substantial proportion of the stabilizer molecules form more than 10 covalent links with the disperse polymer, stable, noncoagulated dispersions are difficult to form and we limit our invention accordingly. The facility with which stable dispersions can be prepared usually increases as the number of covalent bonds formed per stabilizer molecule decreases and we have found that provided each reacted stabilizer molecule forms from one–four covalent bonds with the disperse polymer, dispersions of high stability are readily formed. Accordingly our preferred stabilizers are those which when coreacted have from one –four covalent bonds per stabilizer molecule with the disperse polymer.

A stabilizer may be modified as described above before the dispersion polymerization reaction is carried out.

Alternatively, modification of the selected stabilizer may be carried out after the dispersion polymerization process is completed. For example association between the stabilizer and the disperse polymer may be the result of interaction between amide groups in the stabilizer and hydroxyl groups in the disperse polymer. Covalent links between the stabilizer molecules and disperse polymer are then formed by first converting the amide groups to e.g. methoxy ethyl derivatives and then reacting these ether groups with hydroxyl groups of the disperse polymer.

The dispersions of this invention are formed by the dispersion polymerization of $\alpha$, $\beta$-ethylenically unsaturated monomer in the inert organic liquid in the presence of the stabilizer, which initially is in solution in the liquid. Conventional polymerization initiators, chain transfer agents etc. may be used in the dispersion polymerization process provided they do not interfere with the reactive groups which must react to provide the chemical link between the stabilizer and the disperse polymer.

As stated above the stabilizer and disperse polymer may be covalently linked during the dispersion polymerization process by a copolymerization reaction. When the coreaction between the stabilizer and the disperse polymer is an addition reaction, the coreaction is carried out at the completion of the dispersion polymerization process, when it is initiated, for example, by raising the temperature of the dispersion and/or by the addition of an appropriate catalyst. Another method, in which modification of the stabilizer and the formation of covalent links between the stabilizer and the disperse polymer takes place simultaneously is to coreact chemically reactive groups, which may be of the same type, in both the stabilizer and disperse polymer with a reactive bridging compound. For example a disperse polymer providing epoxy groups may be stabilized in an inert organic liquid by a stabilizer which also provides epoxy groups, the association of stabilizer with disperse polymer being the result of polar interaction between the respective epoxy groups. On addition of a diamine, for example ethylene diamine, covalent links are formed between the stabilizer and disperse polymer through the diamine bridging compound.

While it is desirable in order to achieve the maximum utilization of stabilizer for all stabilizer molecules present in the dispersion to be covalently bonded to the disperse polymer, in practice factors such as, for example, steric hindrance and reaction equilibria, make this difficult to achieve. It is sufficient for the performance of this invention if substantially all of the stabilizer molecules are coreacted with the disperse polymer. For example the concentration of stabilizer used in the dispersions can be from 3 to 40 percent by weight of disperse polymer. When a relatively low concentration of stabilizer is used in the dispersion and in particular when the coreaction between stabilizer and disperse polymer is a copolymerization reaction, 80 to 90 percent of the stabilizer may be so-reacted. On the other hand, when the coreaction is an addition reaction and in particular when relatively high concentrations of stabilizer are used in the dispersion, the achievable proportion of coreacted stabilizer may be of the order of 60 to 70 percent.

When the inert organic liquid comprises at least one liquid which is a nonsolvent for the disperse polymer in combination with at least one other liquid of lower volatility than the nonsolvent liquid and which in addition is a solvent for the disperse polymer, we prefer to carry out the dispersion polymerization in the nonsolvent liquid, optionally in the presence of a minor proportion, e.g. up to 10 percent by weight, of a liquid which is *per se* a solvent for the disperse polymer. The balance, if any, of solvent liquid required in the completed dispersion is then added gradually and preferably at room temperature to the dispersion after stabilizer and disperse polymer are covalently linked.

Although we place no restrictions on the balance of nonsolvent and solvent liquids which comprise the inert organic liquid, other than that the disperse polymer must remain insoluble in the liquid, it will be apparent to those skilled in the art that as the composition of the liquid approaches the point at which it swells or dissolves the disperse polymer, the liquid provides a decreasingly favorable environment in which to prepare a dispersion of maximum stability. An indication of the limiting composition of inert liquid in which the disperse polymer will remain insoluble may be deduced from the solubility parameters of the liquid and the disperse polymer, when calculated by the method described in the "Journal of Paint Technology", 38, May 1966, 269 –28 and 39, Jan. 1967, 19 –27. The maximum preferred proportion of solvent liquid in the dispersion will depend on the nature of the nonsolvent liquid, solvent liquid, disperse polymer and the molecular weight of the disperse polymer and to the interactions between the above components: Consequently a general overall value applicable to all dispersions cannot be given. However, as a general guide the following combinations of solvent and nonsolvent have been found to provide suitable inert organic liquids for the disperse polymers indicated.

| Inert organic liquid | | | | Disperse polymer |
|---|---|---|---|---|
| Non-Solvent | | *per se* Solvent | | |
| Nature | Parts | Nature | Parts | |
| Heptane | 7.5 | Butyl benzyl phthalate | 2.5 | poly(methyl methacrylate) |
| Heptane | 7.5 | Butyl benzyl phthalate: 2-ethoxy e ethanol acetate (1:1) | 5.0 | poly(methyl methacrylate) |
| Aliphatic hydrocarbon, Boiling point approx. 120 °C | 8.75 | Butyl benzyl phthalate: 2-ethoxy ethanol acetate (1:1) | 7.5 | poly(methyl methacrylate) |
| Heptane: Xylene (4:1) | 7.5 | Propylene carbonate | 5.0 | styrene/maleic anhydride (1:1) copolymer |
| Heptane | 7.5 | *iso*-Octyl benzyl phthalate | 5.0 | vinyl acetate/ dimethyl maleate (4:1) copolymer |

When a film is formed on a substrate from a dispersion of polymer particles in an inert organic liquid of the above type it is believed that on evaporation of substantially all of the nonsolvent component the remaining liquid at least temporarily lowers the glass transition temperature of the disperse polymer particles thereby facilitating their coalescence. A well-integrated film may then form at temperatures lower than the glass transition temperature of the unmodified disperse polymer.

The solvent component may comprise at least one component which is a swelling agent or solvent for the disperse polymer and which is sufficiently nonvolatile to be retained at least in part by the coalesced film for an extended period of time. That is it may be a plasticizer for the polymer. For example in the above table butyl benzyl phthalate is a plasticizer for poly (methyl methacrylate).

Dispersions of the type we have described have application as, for example, surface-coatings, when they may include other components such as pigments, thickeners, pigment dispersants and light-degradation stabilizers.

The invention is illustrated in the following examples, in which all parts are expressed by weight:

EXAMPLE 1

Preparation of a stable dispersion of poly (methyl methacrylate) in an inert organic liquid. The stabilizer is covalently linked to the disperse polymer by copolymerization therewith. The number of covalent links formed between each coreacted stabilizer molecule and the disperse polymer is limited by providing on average 3.49 polymerizable double bonds per stabilizer molecule. Comparative tests are made with a control dispersion.

STABILIZER PREPARATION

A self-polyester of 12 -hydroxy stearic acid of molecular weight about 1700 condensed with glycidyl methacrylate to introduce a polymerizable double bond (hereinafter referred to as Monomer A) was copolymerized with methyl methacrylate and glycidyl methacrylate in the ratio by weight of 50 : 46 : 4 in the presence of butyl acetate and ethyl acetate in the weight proportion of 1:2. A 50 percent solution of a polymeric stabilizer of molecular weight about 30,000 was formed. (Stabilizer solution A).

The stabilizer so-produced was then modified to introduce therein polymerizable double bonds in the following manner.

The following mixture:

| | |
|---|---|
| stabilizer solution (above) | 200 parts |
| butyl acetate | 112 parts |
| methacrylic acid | 1 parts |
| hydroquinone | 0.02 parts |
| coconut fatty acids tertiary amine catalyst | 0.10 parts | was heated to reflux (approximately 110° C.) in a reaction vessel fitted with a reflux condenser and held at reflux for 5 hours. The solution of modified stabilizer so-formed will be referred to as stabilizer solution B.

Dispersion Polymerization a mixture of:

| | |
|---|---|
| stabilizer solution B | 7.98 parts |
| aliphatic hydrocarbon (boiling range 92°–118° C., 10% aromatics) | 306.00 parts |
| aliphatic hydrocarbon (boiling range 60°–90° C., 5% aromatics) | 306.00 parts |
| methyl methacrylate | 32.40 parts |
| azodiisobutyronitrile | 2.30 parts | was added to a reaction vessel fitted with a reflux condenser, heated to reflux and held at reflux for 20 minutes. A very fine cloud of disperse polymer formed.

The following mixture:

| | |
|---|---|
| stabilizer solution B | 138.0 parts |
| methyl methacrylate | 697.0 parts |
| azodiisobutyronitrile | 2.3 parts |
| primary octyl mercaptan (10% solution in aliphatic hydrocarbon) | 1.5 parts | was then added at a uniform rate over a period of 3 hours to the refluxing contents of the reaction vessel in such a manner that the mixture feed was well diluted by the reflux return. Refluxing was continued for a further 30 minutes. A stable 53 percent solids dispersion of poly (methyl methacrylate) of particle diameter 0.1 to 0.3 micron was obtained (Dispersion B), in which the stabilizer associated with and was covalently linked to the disperse polymer.

A control dispersion was prepared using the method and compositions given above, except that stabilizer solution B was replaced by an equal weight (on a solids basis) of stabilizer solution A. The stabilizer was not modified to copolymerize with the disperse polymer. The dispersion so-produced (Dispersion A) was a stable 55 percent solids dispersion of poly (methyl methacrylate) of particle diameter 0.1 to 0.2 micron, in which the stabilizer associated with the disperse polymer.

STABILITY TESTS

The control dispersion (Dispersion A) and the dispersion prepared according to this invention (Dispersion B) were tested for storage stability at 45° C after dilution with liquids comprising at least one solvent for the disperse polymer, according to the following formulas. All additions to the dispersions were made slowly with constant stirring.

Test 1

| | |
|---|---|
| dispersion under test | 132 parts |
| butyl benzyl phthalate | 30 parts |
| aliphatic hydrocarbon (boiling range 60°–118° C., 8.5% aromatics) | 30 parts |

Test 2

| | |
|---|---|
| dispersion under test | 132 parts |
| butyl benzyl phthalate | 30 parts |
| 2-ethoxy ethanol acetate | 30 parts |
| aliphatic hydrocarbon (boiling range 60°–118° C., 8.5% aromatics). | 30 parts |

Test 3

| | |
|---|---|
| dispersion under test | 132 parts |
| butyl benzyl phthalate | 45 parts |
| 2-ethoxy ethanol acetate | 45 parts |
| aliphatic hydrocarbon (boiling range 60°–118° C., 8.5% aromatics) | 45 parts |

The tests are of increasing severity in the order given.
The results of the stability tests were as follows:

| Test | Dispersion | Result |
|---|---|---|
| 1 | A | gelled, 35 minutes at room temperature. |
| 1 | B | stable after 10 days at 45° C. |
| 2 | A | gelled, 13 minutes at room temperature. |
| 2 | B | stable after 10 days at 45° C. |
| 3 | A | gelled, 2 minutes at room temperature. |
| 3 | B | stable after 10 days at 45° C. |

The control dispersion in each test gelled before the sample reached 45° C. and hence the times recorded for Dispersion A are for the gel time at ambient room temperature.

Film Formation

Dispersion A, Dispersion B and diluted samples of Dispersion B prepared according to the directions for Test 2 and Test 3 above were each applied as wet films to plate glass panels using a film applicator with a clearance of 0.01 inch. On evaporation of the inert organic liquid, at ambient room temperature Dispersion A and Dispersion B deposited uncoalesced powdered polymer. The samples according to Test 2 and Test 3 produced flexible, well coalesced films at temperatures lower than the glass transition temperature of the disperse polymer.

EXAMPLE 2

Preparation of a stable dispersion of poly (methyl methacrylate) in an inert organic liquid. The stabilizer is covalently lined to the disperse polymer by copolymerization therewith at two levels of coreaction and a comparison made of the dispersions so-formed. The number of covalent links formed between each coreacted stabilizer molecule and the disperse polymer is limited by providing on average 1.6 and 3.49 polymerizable double bonds respectively per stabilizer molecule.

A solution of a polymeric stabilizer was produced by the general method of example 1 (stabilizer solution A) the reactants being Monomer A/methyl methacrylate/glycidyl methacrylate in the weight ratio of 50:48:2.

Two samples of the stabilizer solution so-produced were then separately modified to introduce therein polymerizable double bonds by the method described in example 1, one sample being reacted with 0.48 parts of methacrylic acid and the other sample being reacted with one part of methacrylic acid, per 200 parts of stabilizer solution. Again following the method of example 1, stable dispersions of poly (methyl methacrylate) were prepared from each of the above modified stabilizer solutions and designated Dispersion C (0.48 parts of methacrylic acid in the stabilizer) and Dispersion D. (one part of methacrylic acid in the stabilizer).

EXAMPLE 3

Stability tests were carried out according to example 1 with the following results:

| Test | Dispersion | Result |
|---|---|---|
| 1 | C | stable after 10 days at 45° C. |
| 1 | D | stable after 10 days at 45° C. |
| 2 | C | stable after 10 days at 45° C. |
| 2 | D | stable after 10 days at 45° C. |
| 3 | C | gelled, 14 minutes at room temperature. |
| 3 | D | stable after 10 days at 45° C. |

The stabilizer of Dispersion C provides approximately one half of the number of double bonds per unit weight of stabilizer available in the stabilizer of Dispersion D, for copolymerization with the disperse polymer. The above results show the superior performance in the severest stability test, Test 3, of the Dispersion D.

Preparation of a stable dispersion of a terpolymer of methyl methacrylate, butyl methacrylate and glycidyl methacrylate in an inert organic liquid. The stabilizer is covalently linked to the disperse polymer by copolymerization therewith. The number of covalent links formed between each coreacted stabilizer molecule and the disperse polymer is limited by providing on average 3.49 polymerizable double bonds per stabilizer molecule. Comparative tests are made with a control dispersion.

Dispersion Polymerization

A mixture of:

| | |
|---|---|
| stabilizer solution B (as in example 1) | 7.98 parts |
| aliphatic hydrocarbon (boiling range 92°–118° C., 10% aromatics) | 306.00 parts |
| aliphatic hydrocarbon (boiling range 60°–90° C., 5% aromatics) | 306.00 parts |
| methyl methacrylate | 22.68 parts |
| butyl methacrylate | 6.48 parts |
| glycidyl methacrylate | 3.24 parts |
| azodiisobutyronitrile | 2.30 parts | was added to a reaction vessel fitted with a reflux condenser, heated to reflux and held at reflux for 20 minutes. A very fine cloud of disperse polymer formed.

The following mixture:

| | |
|---|---|
| stabilizer solution B (as in example 1) | 138.0 parts |
| methyl methacrylate | 487.9 parts |
| butyl methacrylate | 139.4 parts |
| glycidyl methacrylate | 69.7 parts |
| azodiisobutyronitrile | 2.3 parts |
| primary octyl mercaptan (10% solution in aliphatic (hydrocarbon) | 1.5 parts | was then added at a uniform rate over a period of 3 hours to the refluxing contents of the reaction vessel in such a manner that the mixture feed was well diluted by the reflux return. Refluxing was continued for a further 30 minutes. A stable 53 percent solids dispersion of particle size 0.1 to 0.3 microns was obtained (Dispersion F) in which the stabilizer associated with and was covalently linked to the disperse polymer.

EXAMPLE 4

A control dispersion was prepared using the method and compositions given above except that stabilizer solution B was replaced by an equal weight (on a solids basis) of stabilizer solution A (as in example 1). The stabilizer was not modified to copolymerize with the disperse polymer. The dispersion so-produced (Dispersion E) was of particle diameter 0.1 to 0.3 micron, in which the stabilizer associated with the disperse polymer.

Stability tests were carried out according to example 1 with the following results:

| Test | Dispersion | Result |
|---|---|---|
| 1 | E | gelled within 1 hour at 45° C. |
| 1 | F | stable after 10 days at 45° C. |
| 2 | E | gelled within 1 hour at 45° C. |
| 2 | F | stable after 10 days at 45° C. |
| 3 | E | gelled within 2 minutes at ambient temperature |
| 3 | F | gelled within 1 hour at 45° C. |

Preparation of a stable dispersion of a terpolymer of methyl methacrylate, butyl methacrylate and glycidyl methacrylate. The stabilizer is covalently linked to the disperse polymer by addition reactions utilizing hexamethylene diamine as a bridging agent, after the completion of the dispersion polymerization process. The number of covalent links formed between each coreacted stabilizer molecule and the disperse polymer is limited by providing on average 8.45 chemically reactive groups per stabilizer molecule.

To 300 grams of Dispersion E (as in example 3) 1.25 grams of a 10 percent solution of hexamethylene diamine in toluene was added carefully with stirring. The mixture was stored at 45° C. for 48 hours to enable reaction to take place.

In the stable dispersion so-formed, the stabilizer associated with the disperse polymer and was covalently linked to it by reaction of the epoxide groups of the stabilizer and of the disperse polymer with the hexamethylene diamine bridging compound.

The modified polymer dispersion (Dispersion G) was tested for stability according to the method described in example 1. The results are compared with those obtained with Dispersion E (as in example 3).

| Test | Dispersion | Result |
|---|---|---|
| 1 | E | gelled within 1 hour at 45° C. |
| 1 | G | stable after 10 days at 45° C. |
| 2 | E | gelled within 1 hour at 45° C. |
| 2 | G | stable after 10 days at 45° C. |
| 3 | F | gelled within 2 minutes at ambient temperature |
| 3 | G | gelled within 1 day at 45° C. |

EXAMPLE 5

Preparation of a stable dispersion of poly (methyl methacrylate/maleic anhydride) in an inert organic liquid. The stabilizer is covalently linked to the disperse polymer by addition reactions utilizing ethylene glycol as a bridging compound, after the completion of the dispersion polymerization process. The number of covalent links formed between each coreacted stabilizer molecule and the disperse polymer is limited by providing on average seven chemically reactive groups per stabilizer molecule. Stabilizer Preparation Monomer A, methyl methacrylate and maleic anhydride were copolymerized in the ratio of 50:46:2 in the presence of butyl acetate and ethyl acetate in the weight ratio of 1:2 to provide a 50 percent solution of a polymeric stabilizer of molecular weight about 35,000.

Dispersion Polymerization

A mixture of:

| | |
|---|---|
| stabilizer solution (above) | 5.1 parts |
| aliphatic hydrocarbon (boiling range 92°-118° C., 12% aromatics) | 321.0 parts |
| aliphatic hydrocarbon (boiling range 60°-90° C., 5% aromatics) | 321.0 parts |
| methyl methacrylate | 32.4 parts |
| maleic anhydride | 0.68 parts |
| azodiisobutyronitrile | 1.5 parts | was added to a reaction vessel fitted with a reflux condenser and heated to reflux. The refluxing was continued for 20 minutes. A fine cloud of disperse polymer formed.

The following mixture:

| | |
|---|---|
| stabilizer solution (above) | 88.3 parts |
| methyl methacrylate | 697.0 parts |
| maleic anhydride | 14.3 parts |
| azodiisobutyronitrile | 1.5 parts |
| primary octyl mercaptan (10% solution in aliphatic hydrocarbon) | 1.5 parts | was then added at a uniform rate over a period of three hours to the refluxing batch in such a way that the mixture feed was well diluted by the reflux return. Refluxing was continued for a further 30 minutes. A stable 53 percent solids dispersion of poly (methyl methacrylate/maleic anhydride) of particle diameter 0.1 to 0.3 micron was obtained.

Stabilizer Modification

To 1472 parts of the above dispersion at reflux temperature (approximately 80° C.) was added 800 parts of an aliphatic hydrocarbon liquid (boiling range 130°-140° C.) and reflux condensate removed until the reflux temperature reached 130° C., when 0.6 parts of ethylene glycol were added and the refluxing continued for a further 4 hours.

In the stable dispersion so-formed, the stabilizer associated with the disperse polymer and was covalently linked to it by reaction of anhydride groups of the stabilizer and of the disperse polymer with the ethylene glycol bridging compound.

When the dispersion was tested for stability according to the method of example 1, the following results were obtained:

| Test | Result |
|---|---|
| 1 | stable after 10 days at 45° C. |
| 2 | stable after 10 days at 45° C. |
| 3 | stable after 10 days at 45° C. |

EXAMPLE 6

Preparation of a stable dispersion of poly (methyl methacrylate/maleic anhydride) in an inert organic liquid. The stabilizer is covalently linked to the disperse polymer by an addition reaction utilizing hexamethylene diamine as a bridging compound, after the completion of the dispersion polymerization process. The number of covalent links formed between each coreacted stabilizer molecule and the disperse polymer is limited by providing on average seven chemically reactive groups per stabilizer molecule.

A stable dispersion of poly(methyl methacrylate/maleic anhydride) was prepared according to the method of example 5 and using the unmodified stabilizer of that example.

To 1472 parts of the above dispersion raised to reflux temperature (approximately 80° C.) was added at a uniform rate over a period of 30 minutes 4.0 parts of a 20 percent solution of hexamethylene diamine in toluene. The mixture was held at reflux temperature for a further 4 hours.

In the stable dispersion so-formed, the stabilizer associated with the disperse polymer and was covalently linked to it by reaction of the anhydride groups of the stabilizer and of the disperse polymer with the hexamethylene diamine bridging compound.

When the dispersion was tested for stability according to the method of example 1, the following results were obtained:

| Test | Result |
|---|---|
| 1 | stable after 10 days at 45° C. |
| 2 | stable after 10 days at 45° C. |
| 3 | stable after 10 days at 45° C. |

EXAMPLE 7

Preparation of a stable dispersion of poly(methyl methacrylate/β-hydroxy ethyl methacrylate) in an inert organic liquid. The stabilizer is covalently linked to the disperse polymer by an addition reaction utilizing toluene diisocyanate as a bridging compound, after the completion of the dispersion polymerization process. The number of covalent links formed between each coreacted stabilizer molecule and the disperse polymer is limited by providing on average 4.6 chemically reactive groups per stabilizer molecule.

Using the method of example 1 a stabilizer solution of 50 percent solids in butyl acetate/ethyl acetate (weight ratio 1:2) was prepared from Monomer A/methyl methacrylate/β-hydroxy ethyl methacrylate in the weight ratio of 50:48:2. The polymeric stabilizer had a molecular weight of approximately 30,000.

A mixture of:

| | |
|---|---|
| stabilizer solution (above) | 5.1 parts |
| aliphatic hydrocarbon (boiling range 60°-90° C., 5% aromatics) | 321.0 parts |
| aliphatic hydrocarbon (boiling range 92°-118° C., 12% aromatics) | 321.0 parts |
| methyl methacrylate | 32.4 parts |
| β-hydroxy ethyl methacrylate | 0.68 parts |
| azodiisobutyronitrile | 1.5 parts | was added to a reaction vessel fitted with a reflux condenser, heated to reflux and held at reflux for 20 minutes. A fine cloud of disperse polymer formed.

The following mixture:

| | |
|---|---|
| stabilizer solution (above) | 88.3 parts |
| methyl methacrylate | 697.0 parts |
| β-hydroxy ethyl methacrylate | 14.3 parts |
| azodiisobutyronitrile | 1.5 parts |
| primary octyl mercaptan (10% solution in aliphatic hydrocarbon) | 1.5 parts | was then added at a uniform rate over a period of 3 hours to the refluxing contents of the reaction vessel in such a manner that the mixture feed was well diluted by the reflux return. Refluxing was continued for a further 30 minutes. A stable, 53 percent solids dispersion of poly(methyl methacrylate/β-hydroxy ethyl methacrylate) of particle diameter 0.1 to 0.3 micron was obtained.

Stabilizer Modification

To the above polymer dispersion was added 2.7 parts of a commercial mixed isomers grade of toluene diisocyanate and the mixture refluxed for 30 minutes. Two parts of diethyl aniline were then added and the refluxing continued for a further 6 hours.

A stable polymer dispersion was obtained in which the stabilizer associated with the disperse polymer and was covalently linked to it by reaction of hydroxyl groups of the stabilizer and of the disperse polymer with the toluene diisocyanate bridging compound.

A sample of the above dispersion taken before modification of the stabilizer, i.e. before the stabilizer and disperse polymer were covalently linked, was tested as under as a control dispersion.

The dispersion of this example and the control dispersion were tested for stability by the method of example 1 with the following results:

| Test | Sample | Result |
| --- | --- | --- |
| 1 | example 7 | stable after 10 days |
| 1 | control | gelled in less than 1 hour |
| 2 | example 7 | stable after 10 days |
| 2 | control | gelled in less than 1 hour |
| 3 | example 7 | stable after 10 days |
| 3 | control | gelled in less than 1 hour |

EXAMPLE 8

Preparation of a stable dispersion of poly(methyl methacrylate/$\beta$-hydroxy ethyl methacrylate) in an inert organic liquid. The stabilizer is covalently linked to the disperse polymer by an addition reaction utilizing toluene diisocyanate as a bridging compound, after the completion of the dispersion polymerization process. The number of covalent links formed between each coreacted stabilizer molecule and the disperse polymer is limited by providing on average 4.2 chemically reactive groups per stabilizer molecule.

By the method of example 1 a stabilizer solution was prepared from Monomer A/methyl methacrylate/glycidyl methacrylate in the weight ratio of 50:48:2. The polymeric stabilizer had a molecular weight of about 30,000 and the solution a solids content of 50.0 percent.

The glycidyl groups of the stabilizer were then converted to secondary amine groups by the following method.

The following mixture:

| | |
| --- | --- |
| stabilizer solution (above) | 200 parts |
| butyl acetate | 101 parts |
| methyl amine (10% solution in butyl acetate) | 12.12 parts | was heated to 45° C in a reaction vessel fitted with a reflux condenser and held at that temperature for 48 hours. excess methyl amine and butyl acetate was then distilled off under vacuum to give a solids content of 95 percent and then redissolved to 50 percent solids in a mixture of butyl acetate/ethyl acetate in the weight ratio of 1:2. The solution so-prepared is referred to as the stabilizer solution according to this example.

A stable dispersion of poly(methyl methacrylate/$\beta$-hydroxy ethyl methacrylate) was prepared by the method of example 7 but replacing the stabilizer solution of that example with an equal weight of the above stabilizer solution. The dispersion had a mean particle size of 0.2 micron.

Stabilizer Modification

To the above polymer dispersion was added 5.2 parts of a commercial mixed isomers grade of toluene diisocyanate and the mixture refluxed for 30 minutes. Two parts of diethyl aniline were then added and the refluxing continued for a further 6 hours.

A stable polymer dispersion was obtained in which the stabilizer associated with the disperse polymer and was covalently linked to it by reaction of secondary amine groups of the stabilizer and hydroxyl groups of the disperse polymer with the toluene diisocyanate bridging compound. A A sample of the above dispersion taken before modification of the stabilizer, i.e. before the stabilizer and disperse polymer were covalently linked, was tested as under as a control dispersion.

The dispersion of this example and the control dispersion were tested for stability by the method of example 1 with the following results:

| Test | Sample | Result |
| --- | --- | --- |
| 1 | example 8 | stable after 10 days |
| 1 | control | gelled in less than 1 hour |
| 2 | example 8 | stable after 10 days |
| 2 | control | gelled in less than 1 hour |
| 3 | example 8 | stable after 10 days |
| 3 | control | gelled in less than 1 hour |

The superior stability of the dispersion containing the covalently linked stabilizer is clearly demonstrated.

EXAMPLE 9

Preparation of a stable dispersion of poly(methyl methacrylate) in an inert organic liquid. The stabilizer is covalently linked to the disperse polymer by copolymerization therewith. The number of covalent links formed between each coreacted stabilizer molecule and the disperse polymer is limited by providing on average 5.3 polymerizable double bonds per stabilizer molecule. Comparative tests are made with a control dispersion.

Stabilizer Preparation

A self-polyester of 12-hydroxy stearic acid of molecular weight about 1700 condensed with gylcidyl methacrylate to introduce a polymerizable double bond (hereinafter referred to as Monomer A) was copolymerized with methyl methacrylate and glycidyl methacrylate in the ratio by weight 50:46:4 in the presence of butyl acetate and ethyl acetate in the weight proportion of 1:2. A 50 percent solution of a polymeric stabilizer of molecular weight about 30,000 was formed. (Stabilizer solution A).

The stabilizer so-produced was then modified to introduce therein polymerizable double bonds in the following manner.

The following mixture:

| | |
| --- | --- |
| stabilizer solution (above) | 200 parts |
| butyl acetate | 112 parts |
| methacrylic acid | 1.5 parts |
| hydroquinone | 0.02 parts |
| coconut fatty acids tertiary amine catalyst | 0.10 parts | was heated to reflux (approximately 110° C.) in a reaction vessel fitted with a reflux condenser and held at reflux for five hours. The solution of modified stabilizer so-formed will be referred to as stabilizer solution B.

Dispersion Polymerization

A mixture of:

| | |
| --- | --- |
| stabilizer solution B | 7.98 parts |
| aliphatic hydrocarbon (boiling range 92°–118° C., 10% aromatics) | 306.00 parts |
| aliphatic hydrocarbon (boiling range 60°–90° C., 5% aromatics) | 306.00 parts |
| methyl methacrylate | 32.40 parts |
| azodiisobutyronitrile | 2.30 parts | was added to a reaction vessel fitted with a reflux condenser heated to reflux and held at reflux for 20 minutes. A very fine cloud of disperse polymer formed.

The following mixture:

| | |
|---|---|
| stabilizer solution B | 138.0 parts |
| methyl methacrylate | 697.0 parts |
| azodiisobutyronitrile | 2.3 parts |
| primary octyl mercaptan (10% solution in aliphatic hydrocarbon) | 1.5 parts | was then added at a uniform rate over a period of 3 hours to the refluxing contents of the reaction vessel in such a manner that the mixture feed was well diluted by the reflux return. Refluxing was continued for a further 30 minutes. A stable 53 percent solids dispersion of poly(methyl methacrylate) of particle diameter 0.1 to 0.3 micron was obtained (Dispersion B), in which the stabilizer associated with and was covalently linked to the dispersed polymer.

We claim:

1. In a process of making a stable dispersion of particles of synthetic addition polymer of one or more $\alpha,\beta$-ethylenically unsaturated monomers in an inert organic liquid in which the polymer is insoluble by forming the particles in the liquid by the polymerization therein of $\alpha,\beta$-ethylenically unsaturated monomer in the presence in solution in the liquid of from 3 to 40 percent by weight of the disperse polymer of a preformed polymeric stabilizer having a component which is solvated by the liquid and a component which has an affinity for and associates with the disperse polymer said stabilizer providing around the particles a stabilizing steric barrier to form a dispersion of polymer particles, the improvement which comprises a stabilizer which also contains in said component associated with the disperse polymer reactive groups selected from the class consisting of polymerizable $\alpha,\beta$-ethylenically unsaturated groups and groups which are chemically coreactable with the disperse polymer, said process including the step of coreacting the polymeric stabilizer with the disperse polymer to form from 1 to 10 covalent links between the stabilizer molecule and the disperse polymer.

2. A process of making a stable dispersion according to claim 1 in which each coreacted stabilizer molecule forms from one to four covalent links with the disperse polymer.

3. A process of making a stable dispersion according to claim 1 in which the covalent links between stabilizer and disperse polymer are formed by coreaction between chemical groups provided by the stabilizer and complementary chemical groups provided by the disperse polymer.

4. A process of making a stable dispersion according to claim 3 in which the coreaction is an addition reaction carried out at the completion of the polymerization process.

5. A process of making a stable dispersion according to claim 4 in which modification of a selected stabilizer is carried out at the completion of the polymerization process.

6. A process of making a stable dispersion according to claim 5 in which the addition reaction is a coreaction between chemically reactive groups in both the stabilizer and disperse polymer with a reactive bridging compound.

7. A process of making a stable dispersion according to claim 1 in which the covalent links between stabilizer and disperse polymer are formed by a copolymerization reaction during the polymerization process.

8. A process of making a stable dispersion according to claim 1 in which the inert organic liquid comprises at least one liquid which is a nonsolvent for the disperse polymer in combination with a minor proportion of at least one other liquid which is of lower volatility than the nonsolvent liquid and which in addition is a solvent for the disperse polymer.

UNITED STATES PATENT OFFICE
CERTIFICATE OF CORRECTION

Patent No. 3,607,821　　　　　Dated September 21, 1971

Inventor(s) Michael Raymond Clarke and Leon Filipowiez

It is certified that error appears in the above-identified patent and that said Letters Patent are hereby corrected as shown below:

Claim 1, line 13, after "prises"

insert --using--

Signed and sealed this 25th day of April 1972.

(SEAL)
Attest:

EDWARD M. FLETCHER, JR.　　　　ROBERT GOTTSCHALK
Attesting Officer　　　　　　　　Commissioner of Patents